United States Patent [19]

Payerle

[11] Patent Number: 4,686,059

[45] Date of Patent: Aug. 11, 1987

[54] ANTIMONY TARTRATE CORROSION INHIBITIVE COMPOSITION FOR COOLANT SYSTEMS

[75] Inventor: Norman E. Payerle, Wappingers Falls, N.Y.

[73] Assignee: First Brands Corporation, Danbury, Conn.

[21] Appl. No.: 828,657

[22] Filed: Feb. 12, 1986

[51] Int. Cl.$^4$ .............................................. C09K 5/00
[52] U.S. Cl. ...................................... 252/75; 252/74; 252/76; 252/389.3; 252/389.4; 252/389.54; 422/7; 422/13; 422/16; 422/17; 422/19
[58] Field of Search .................. 252/74, 75, 76, 389.3, 252/389.4, 389.54; 422/7, 13, 16, 17, 19

[56] References Cited

U.S. PATENT DOCUMENTS

| | | | |
|---|---|---|---|
| 1,915,148 | 6/1933 | Berliner et al. | 252/76 |
| 2,303,399 | 12/1942 | Schwartz | 252/135 |
| 2,972,581 | 2/1961 | Johnson et al. | 252/75 |
| 3,808,140 | 4/1974 | Mago et al. | 252/389.54 |
| 4,149,985 | 4/1979 | Wilson | 252/75 |
| 4,242,214 | 12/1980 | Lambert, Jr. | 252/75 |
| 4,402,847 | 9/1983 | Wilson et al. | 252/75 |

*Primary Examiner*—Robert A. Wax
*Attorney, Agent, or Firm*—Gary L. Warner

[57] ABSTRACT

An automobile coolant concentrate comprising (a) a liquid polyhydric alcohol, and (b) a corrosion inhibitor comprising an alkali metal antimony tartrate, preferably with an azole compound, in a corrosion inhibitory amount with respect to corrosion of lead-containing solders.

31 Claims, No Drawings

4,686,059

ANTIMONY TARTRATE CORROSION INHIBITIVE COMPOSITION FOR COOLANT SYSTEMS

FIELD OF THE INVENTION

The present invention relates to heat transfer fluids having corrosion inhibitory ability when used in coolant systems, such as in automobile coolant systems.

BACKGROUND OF THE INVENTION

Coolant systems, such as those used in automobiles, commonly use a coolant fluid concentrate comprising an alcohol, such as ethylene glycol, which is usually diluted with water when used in the coolant system. The alcohol/water mixture is corrosive to the metals, such as steel, cast iron, brass, copper, lead/tin solders, and aluminum, in which the coolant comes in contact during operation of the coolant system. In order to prevent corrosion of these metals, there have been a wide variety of corrosion inhibitors added to the coolant fluid concentrate to retard the corrosion of the metallic surfaces in contact with the coolant fluid. In addition, pH buffers are frequently added to maintain a basic pH to prevent acid corrosion. Therefore, an effective corrosion inhibitor additive must maintain its corrosion inhibitory effect at a basic pH value. Also because of the wide variety of metals and alloys used in an automobile coolant system, the corrosion inhibitor additive should be noncorrosive to all the metals present and not lessen the noncorrosive properties of other constituents that may also be present in the coolant. Many corrosion inhibitors have been suggested to inhibit the corrosion of one or more metals found in a coolant system. These include guanadine, citrates, coal tar derivatives, petroleum bases, thiocyanates, peptones, phenols, thioureas, tannin, quinoline, morpholine, triethanolamine tartrates, glycol mono-ricinoleate, organic nitrites, mercaptans, sulfonated hydrocarbons, fatty oils, triazoles, mercaptobenzothiazoles, phenothiazine, piperazine, sulfates, sulfides, fluorides, hydrogen peroxide, alkali metal chromates, nitrites, phosphates, borates, tungstates, molybdates, carbonates, silicates, silicones and silicate-silicone copolymers.

In modern automobile coolant systems there is a wider use of solders with a higher lead content, as high as about 95 percent lead or greater, as compared with formerly used alloys which have a lead content of about 70 weight percent lead. Under corrosive conditions, the higher lead solders are susceptible to the formation of "solder bloom", which is the accumulation of corrosion products of lead upon the solder surface. Since these corrosion products remain in-situ and have a much higher volume than the original lead solder, solder bloom accumulation can result in a significant lowering of the cross-sectional area and restriction of the smaller heat exchange openings. This in turn causes a significant decrease in the heat-exchange capacity of the coolant system and eventual overheating of the internal combustion engine.

Solder bloom corrosion was not considered a serious problem until the middle 1960's when higher lead solders began to commonly appear in automotive heat exchange systems. Solder blood accumulation is typically nonexistent or insignificant in heat exchange systems using the lower 70 weight percent lead content solders, thus until the use of solder with a lead content equal to or greater than about 95 weight percent became prevalent, solder bloom corrosion in automobile coolant systems was not generally significant. As the use of high lead solders has increased, the number of cars that are susceptible to serious solder bloom corrosion has also increased. There is, therefore, a continuing need for a coolant composition that inhibits the formation of solder bloom.

Because of the different metals used in a coolant system, it is important that a solder bloom inhibitor not be corrosive toward other metals, in particular aluminum. Aluminum now is used in increasing frequency in the construction of engine blocks, heads, radiators, and the like. This use of aluminum has presented new problems due to the aluminum coming in contact with the coolant fluid. Aluminum tends to corrode at hot heat exchange surfaces in the block and the head to form soluble corrosion products. These soluble corrosion products then precipitate at cooler surfaces in the heat exchange system where their concentration exceeds their solubility. The resulting precipitate deposits can then accumulate to an extent to restrict the openings for fluid flow in the radiator core, cover the inner heat exchange surface of the radiator, and thereby lower the cooling efficiency of the cooling system. It is desirable, therefore, that an antifreeze concentrate inhibit corrosion towards aluminum and not significantly interfere with the corrosion inhibitory function of other additives that may be present.

Antimony compounds have been known to act as corrosion inhibitors for steel in acid solutions. For example, Mago et al. in U.S. Pat. No. 3,808,140 disclose the use of antimony compounds as corrosion inhibitors of steel exposed to alkanolamine solutions employed in acid gas removal service. As disclosed by Mago et al., antimony compounds inhibit the acid corrosion of ferrous metals in carbonate solutions. (See col 2, lines 7 to 15).

Schwartz in U.S. Pat. No. 2,303,399 discloses an alkali detergent used for cleaning soft metal such as aluminum and tin. Added to the detergent is an antimony salt to reduce the corrosive effect of the solution. The detergent cleaning solutions are essentially oxygenated solutions of water, and corrosion would result from interaction of the dissolved oxygen and water to dissolve or corrode the metal (see col. 1, line 36).

Berliner et al. in U.S. Pat. No. 1,915,148 disclose an antifreeze composition for inhibiting the corrosion of oxidizable metals which comprises a lower aliphatic alcohol (methanol, ethanol, propanol) and a tartrate compound such as an alkali tartrate, alkaline earth tartrate, or antimony alkali tartrate. Since the tartrate compounds are more soluble in water, they are preferably dissolved first in water which is then subsequently added to the alcohol.

An object of the invention is to provide a coolant composition that inhibits corrosion from metal surfaces in automobile cooling systems, in particular a composition that inhibits solder bloom corrosion on lead solder surfaces.

It is also an object of the invention to provide a corrosion inhibitor that is compatible with the components of current coolant compositions.

SUMMARY OF THE INVENTION

An aspect of the present invention is an automobile coolant concentrate comprising (a) liquid, polyhydric alcohol, and (b) alkali metal antimony tartrate in a corrosion inhibitory amount with respect to corrosion of lead-containing solders.

In a preferred embodiment, the invention includes an automobile coolant concentrate comprising (a) liquid, polyhydric alcohol, and (b) corrosion inhibitors in a corrosion inhibitory amount with respect to corrosion of lead-containing solders. The corrosion inhibitors comprise (i) an alkali metal antimony tartrate, and (ii) an azole compound.

In the coolant concentrate or the invention an alkali metal antimony tartrate (AMAT) is dissolved in an essentially water-free polyhydric alcohol. For use as a coolant solution, the concentrate is either used as is, or is diluted with water either before it is added to the cooling system or after when it is in the cooling system.

Another aspect of the present invention is the above automobile coolant concentrate additionally comprising a metal surface corrosion inhibitor other than the alkali metal antimony tartrate, in particular a copper, aluminum and/or a ferrous metal corrosion inhibitor, in an amount to inhibit corrosion of the metals of the cooling system.

Still, another aspect of the invention is a method for inhibiting corrosion on metal surfaces in a coolant system which comprises adding to the coolant system any of the above defined concentrates to provide a coolant solution, and circulating the coolant solution through the cooling system. Water may be added to the concentrate, either before or after addition to the cooling system.

A further aspect of the invention, is a method for producing a concentrate composition with corrosion inhibitive properties with respect to corrosion on the surfaces of lead-containing solder alloys, which comprises dissolving of alkali metal antimony tartrate in a liquid polyhydric alcohol. Preferably an azole compound is also dissolved in the polyhydric alcohol.

DESCRIPTION OF THE INVENTION

The antifreeze concentrate composition of the invention comprises an alkali metal antimony tartrates dissolved in a liquid polyhydric alcohol. The polyhydric alcohol is one that is liquid in the conditions which may normally exist in the environment of the cooling system. The polyhydric alcohol is preferably any one or a mixture of polyhydric alcohols from the group consisting of ethylene glycol, diethylene glycol, and propylene glycol. Principally for reasons of economics, the preferred polyhydric alcohol is ethylene glycol.

In order to meet the standards of the commercial market, the concentrate of the invention should be essentially water-free. As used herein, 37 water-free means containing no more than about 5, preferably no more than about 3.5, weight percent water, based on the total weight of the antifreeze concentrate. This water includes water introduced during the manufacturing process, as an impurity in the concentrate components, water of hydration of salt additives, and water produced in acid/base reactions.

The concentration of the AMAT in the antifreeze concentrate is such so as to provide a corrosion inhibitory effect with respect to solder bloom on the surfaces of metals containing lead. As use herein, "corrosion inhibitory effect" means that in the environment of the cooling system, the corrosion of a surface of the subject metal is inhibited by the presence of a substance in the coolant solution. For AMAT, the concentration is sufficient to decrease solder bloom corrosion of surfaces of lead-containing solders. As used herein, lead-containing solders means the lead based solders commonly used to join metal parts in automobile coolant systems. Typically these alloys contain greater than about 70 wt.% lead, but may contain about 95 wt.%, or more, lead, the remainder being generally tin and/or silver. The composition of the invention is particularly effective in inhibiting solder bloom on surfaces of the high lead solders containing 95 wt.% lead or more.

Corrosion inhibition with respect to solder bloom is provided even at low AMAT concentrations in the antifreeze concentrate. As the concentration is raised, corrosion inhibition is increased, however, the incremental increase becomes smaller as concentration of the AMAT increases, until it is no longer economical to add additional AMAT for further metal corrosion inhibition. The optimum concentration of AMAT in the antifreeze concentrate is between about 0.01 and about 1, preferably between about 0.05 and about 0.5, more preferably about 0.1 weight percent basis as $K(SbO)C_4H_4O_6 \cdot \frac{1}{2}H_2O)$. It is to be understood that, these concentration ranges are typical average values and in a particular system may vary either up or down, due to interactions of the AMAT with other additives in the concentrate.

The liquid concentrate of the invention is used by adding it to a cooling system to provide a coolant solution. The concentrate may be used as is, or preferably diluted with water at a weight ratio of concentrate to water of from about 99:1 to about 1:99, preferably from about 4:1 to about 1:4, more preferably from about 3:1 to about 1:2, most preferably about 1:1. The cooling solution is then contacted with the metal surfaces of the cooling system by circulating the cooling solution through the cooling system.

The preferred alkali metal antimony tartrates are the potassium or sodium salts, more preferably potassium antimony tartrate $(K(SbO)C_4H_4O_6 \cdot \frac{1}{2}H_2O)$.

The concentrates of the invention when diluted with water at a ratio of 2 parts water to 1 part concentrate should preferably have a pH value not less than about 7, preferably not less than about 8.5. Buffers can be used to control the pH. Suitable buffers are alkali; alkaline earth; quaternary-ammonium mono-, secondary-, tertiary-amine; and hydroxy amine salts of borates, phosphates, sebacates, and mixtures of hydroxy benzoates.

The composition of the invention preferably contains other known corrosion inhibitors for inhibition of corrosion of metal surfaces found in automobile coolant systems, in particular ferrous metals and aluminum. Suitable inhibitors for use in automobile coolant systems include alkali metal, alkaline earth metal or alkanolamine salts of silicates, borates, phosphates and benzoates, hydroxy benzoates or acids thereof, silicones alkali metal nitrates, alkali metal nitrites, an azole compound, or mixtures thereof. Generally any formulation is suitable, but, as shown in Examples III and IV, in formulations with silicates, or an azole compound, the corrosion inhibitive effect is particularly good with respect to high lead solders.

The nature and amounts of the corrosion inhibitors and additives other than AMAT may be the same as if the alkali earth antimony tartrate corrosion inhibitor is not present. However, lesser amounts of these other corrosion inhibitors may be used, depending on the particular inhibitors used, because of the corrosion inhibitive effect of the AMAT. Generally, when one or more of the known inhibitors are used with the alkali metal antimony tartrate corrosion inhibitors of the invention, the total amount of all the inhibitors should be used in an inhibitory effective amount.

A particularly preferred formulation of the invention contains an antimony tartrate salt and an azole compound. Azole compounds are typically used to inhibit corrosion of copper and brass, which is nonanalogous to the synergistic combination of an antimony tartrate salt and an azole compound for the inhibition of solder corrosion. Suitable azole compounds are the water-soluble triazoles, pyrazoles, imidazoles, isooxazoles, isothiazoles, thiazoles, thiadiazole salts, and the like. Typically the alkali metal salts are used. Preferred azole compounds are 1,2,3-tolyltriazole, 1,2,3-benzotriazole, and sodium 2-mercaptobenzothiazole.

Other typical optional additives include other minor ingredients known in the art that do not adversely affect the inhibition of solder bloom corrosion of the alkali metal antimony tartrates, or the resistance to metal corrosion of these and the other corrosion inhibitors. These include wetting agents and surfactants, such as, for example, known ionic and nonionic surfactants such as the poly(oxyalkylene) adducts of fatty alcohols; antifoams and/or lubricants such as the well known polysiloxanes and the polyoxyalkylene glycols.

The following examples are intended to illustrate the invention, and are not intended to limit the scope of the present invention in any manner.

EXAMPLE I

Concentrates containing the corrosion inhibitor of the invention and formulations containing known corrosion inhibitors and buffers were made and tested for their corrosion inhibitor effect. Three concentrate base formulations were made by dissolving in ethylene glycol, a tetraborate, a metaborate, a phosphate. A blank base was also made of ethylene glycol with no dissolved additives. To portions of each base were added 0.0, 0.05, and 0.10 wt.% KAT, respectively. The following were used in the formulations: potassium antimony tartrate (KAT) as $K(SbO)C_4H_4O_6 \cdot \frac{1}{2}H_2O$, sodium tetraborate as $Na_2B_4O_7 \cdot 5H_2O$), sodium metaborate as $Na_2B_2O_4 \cdot 8H_2O$, phosphoric acid as a 75 wt.% $H_3PO_4$ aqueous solution, and sodium hydroxide as a 50 wt.% NaOH aqueous solution.

The components were added in the proportions shown in Table I-A. Also shown is the pH of the solution after dilution of each test concentrate at a ratio of 1 part concentrate to 2 parts water.

TABLE I-A

| | Test Coolants - I | | | | | |
|---|---|---|---|---|---|---|
| Test | KAT | Tetra-Borate | Meta-Borate | 0.75% $H_3PO_4$ | 50% NaOH | pH |
| | | (Weight Percent) | | | | |
| Tetraborate | | | | | | |
| I-18 | — | 1.968 | — | — | — | 7.7 |
| I- 1 | 0.05 | 1.965 | — | — | — | 7.7 |
| I- 2 | 0.10 | 1.965 | — | — | — | 7.7 |
| Metaborate | | | | | | |
| I-19 | — | — | 1.865 | — | — | 9.6 |
| I- 5 | 0.05 | — | 1.865 | — | — | 9.3 |
| I- 6 | 0.10 | — | 1.865 | — | — | 9.1 |
| Phosphate | | | | | | |
| I-20 | — | — | — | 1.7639 | 2.1595 | 9.7 |
| I- 9 | 0.05 | — | — | 1.7639 | 2.1595 | 8.6 |
| I-10 | 0.10 | — | — | 1.7639 | 2.1595 | 8.4 |
| Blank | | | | | | |
| I-21 | — | — | — | — | — | 8.5 |

Each formulation was tested according to the standardized glassware test, ASTM D 1384. In summary, a test coolant was prepared by mixing the concentrate formulation with water at a weight ratio of concentrate to water of 1:2, to provide a test coolant solution. The pH values for the test coolant solutions are shown in Table I-A. The water used is corrosive water containing 100 ppm each of sulfate, chloride and bicarbonate ions introduced as sodium salts. Specimens of metals being tested were totally immersed in the test coolant solution with aeration for 336 hours at 190° F. (88° C.). During the test the coolant was aerated at a rate of 100±10 ml air/min. The corrosion inhibitive properties of the test coolant were evaluated on the basis of the weight changes incurred by the metal specimens after the adherent deposits were removed from each specimen. Each test is run in triplicate, and the average weight change is determined for each metal.

The metals used in the tests are those for the ASTM D 1384 test reference above, except a high lead solder alloy specimen (HiLead) was also tested. The high lead solder was available under the Trademark "Modine TM" (a solder with about 95 wt.% lead, 4.5 wt.% zinc, and 0.5 wt.% silver) Another solder tested was ASTM B 32 solder (LoLead), a low lead solder containing about 70 wt.% lead and about 30 wt.% other metals, predominantly tin. Other metals tested were copper, brass, steel, cast iron, and cast aluminum.

The results of the tests are summarized in Table I-B. The values in Table I-B show the weight lost per specimen.

TABLE I-B

| | Weight Loss I | | | | | | |
|---|---|---|---|---|---|---|---|
| Test | HiLead | Cu | LoLead | Brass | Steel | C.Iron | C.Al |
| | | | (milligram lost/specimen) | | | | |
| Tetraborate | | | | | | | |
| I-18 | 27 | 5 | 207 | 6 | 107 | 195 | 178 |
| I- 1 | 25 | 4 | 4 | 4 | 1 | 1 | 146 |
| I- 2 | 33 | 2 | 2 | 2 | 1 | 0 | 32 |
| Metaborate | | | | | | | |
| I-19 | 564 | 2 | 26 | 1 | 89 | 32 | 68 |
| I- 5 | 22 | 3 | 383 | 2 | 3 | 75 | 177 |
| I- 6 | 33 | 2 | 1 | 0 | 0 | 1 | 69 |
| Phosphate | | | | | | | |
| I-20 | 34 | 4 | 1 | 1 | 2 | 53 | 8 |
| I- 9 | 135 | 6 | 2 | 3 | 1 | 3 | 58 |
| I-18 | 97 | 10 | 2 | 3 | 2 | 10 | 69 |
| Blank | | | | | | | |
| I-21 | 330 | 2 | 508 | 2 | 199 | 357 | 80 |

As demonstrated by the above results, the corrosion inhibitive properties of the metaborate-based coolants of the invention, which contain KAT (I-5 and I-6), with respect to Modine TM high lead solders (HiLead), are surprising and unexpected. This is shown by comparison with the control composition (I-19), which does not contain KAT. Table I-B also shows that KAT does not have any significant adverse effect on the corrosion inhibitory properties of other additives.

The solder-bloom corrosion product of the Modine TM high-lead solder (removed for the above weight comparisons) adheres in situ in the actual coolant system environment. The high weight losses shown for non-KAT containing systems, in particular composition I-19, indicates that if such systems are used in actual automotive coolant systems, substantial solder bloom accumulation and significant deterioration of the cooling ability of the cooling system would result.

The tetraborate compositions containing KAT (I-1, in particular I-2), as compared with the control composition (I-18), and particularly the blank composition (I-21), show some solder bloom corrosion inhibition (with respect to high-lead Modine ™ solder, as well as low-lead ASTM (LoLead) solder. Corrosion inhibitory effect is also shown for steel, cast iron, and cast aluminum.

In the phosphate compositions of the invention (I-9 to I-10), there is shown significant improvement in corrosion inhibition for high lead solder, low lead solder, steel, cast iron, and cast aluminum over the blank (I-21). The corrosion inhibition of I-9 and I-10 over the phosphate control (I-20) shows only a little improvement for cast iron. This is believed due to the fact that phosphate itself has good corrosion inhibitive properties and masked the inhibitive effect of the potassium antimony tartrate. This can be shown by comparison of the phosphate control (I-20) with the blank composition (I-21).

EXAMPLE II

Compositions were made as in Example I, except sodium tolyltriazole (NaTTZ) was also added in the composition where potassium antimony tartrate was added. No NaTTZ was added for the control compositions (II-18, II-19, II-20, II-21) which are the same as the control compositions (I-18, I-19, I-20, I-21) in Example I. The test procedure was the same as in Example I. A summary of the proportions of the components in the test concentrate and the dilution pH are shown in Table II-A. The basis for the NaTTZ amounts is a 50 wt.% solution.

The same tests as in Example I were run. The results are summarized in Table II-B.

TABLE II-A

| Test | KAT | 50% NaTTZ | Tetra-Borate | Meta-Borate | 0.75% H$_3$PO$_4$ | 50% NaOH | pH |
|---|---|---|---|---|---|---|---|
| | | | (weight percent) | | | | |
| Tetraborate | | | | | | | |
| II-18 | — | — | 1.968 | — | — | — | 7.7 |
| II-3 | 0.05 | 0.1165 | 1.965 | — | — | — | 7.7 |
| II-4 | 0.10 | 0.1165 | 1.965 | — | — | — | 7.7 |
| Metaborate | | | | | | | |
| II-19 | — | — | — | 1.865 | — | — | 9.6 |
| II-7 | 0.05 | 0.1165 | — | 1.865 | — | — | 9.4 |
| II-8 | 0.10 | 0.1165 | — | 1.865 | — | — | 9.2 |
| Phosphate | | | | | | | |
| II-20 | — | — | — | — | 1.7639 | 2.1595 | 9.7 |
| II-11 | 0.05 | 0.1165 | — | — | 1.7639 | 2.1595 | 8.6 |
| II-12 | 0.10 | 0.1165 | — | — | 1.7639 | 2.1595 | 8.5 |
| Blank and Controls | | | | | | | |
| II-21 | — | — | — | — | — | — | 8.5 |
| II-15 | 0.05 | 0.1165 | — | — | — | — | 8.2 |
| II-16 | 0.10 | 0.1165 | — | — | — | — | 7.7 |

TABLE II-B

| Test | HiLead | Cu | LoLead | Brass | Steel | C.Iron | C.Al |
|---|---|---|---|---|---|---|---|
| | | | Weight Loss II | | | | |
| | | | (milligram lost/specimen) | | | | |
| Tetraborate | | | | | | | |
| II-18 | 27 | 5 | 207 | 6 | 107 | 195 | 178 |
| II-3 | 32 | 2 | 2 | 1 | 0 | 0 | 23 |
| II-4 | 33 | 2 | 1 | 3 | 0 | 0 | 26 |
| Metaborate | | | | | | | |
| II-19 | 564 | 2 | 26 | 1 | 89 | 32 | 68 |
| II-7 | 17 | 3 | 2 | 1 | 1 | 0 | 61 |
| II-8 | 21 | 2 | 1 | 3 | 0 | 0 | 78 |
| Phosphate | | | | | | | |
| II-20 | 34 | 4 | 1 | 1 | 2 | 53 | 8 |
| II-11 | 30 | 2 | 1 | 2 | 1 | 3 | 14 |
| II-12 | 16 | 3 | 1 | 2 | 1 | 3 | 11 |
| Blank and Controls | | | | | | | |
| II-21 | 330 | 2 | 508 | 2 | 199 | 357 | 80 |
| II-15 | 15 | 3 | 44 | 1 | 5 | 310 | 232 |
| II-16 | 13 | 4 | 4 | 1 | 2 | 0 | 18 |

The above results show that in a KAT/NaTTZ/borate system, pH is an important factor. The high pH environment is generally more corrosive to high-lead solders. In a lower pH tetraborate system (II-18, II-3, and II-4), the presence of KAT and NaTTZ do not appear to increase the corrosion inhibitory effect of the high-lead solder. However, low-lead solder, steel, cast iron and cast aluminum are highly protected.

In a metaborate system, (II-19, II-7, and II-8), which is similar to the tetraborate except that the p is higher, sample II-19 (no KAT/NaTTZ) shows significant high lead solder corrosion, and samples according to the invention, II-7, and II-8, show a significant corrosion inhibitory effect of the KAT/NaTTZ combination.

The corrosion inhibitory effect toward high-lead solders of the KAT/NaTTZ in the phosphate system (II-20, II-11, II-12) was apparently masked to a degree by the inhibitory effect of the phosphate. However, the results show an increase in the inhibitory effect towards high lead solders at the higher concentrations of KAT. (Compare II-11 and II-12.) There is also a surprising corrosion inhibition of cast iron.

In the "Blank" system, or the system with no buffer, the results showed a need for inhibition toward high-lead solders in the composition with no buffer, NaTTZ, or KAT (II-21), and the surprisingly excellent overall inhibitory effect shown by the use of the KAT/NaTTZ combination in II-16. Protection for low lead, steel and cast iron is also evident.

The KAT/NaTTZ compositions of the invention also show a surprising corrosion inhibitory effect toward cast iron. In all of the tested buffer systems, as well as the blank, cast iron corrosion was reduced to a negligible degree. While in Example I, cast iron corrosion was also reduced, the corrosion inhibition shown in the present example is more consistent and more dramatic.

The above results show that for compositions with both sodium tolyltriazole and potassium antimony tartrate present, there is a consistent corrosion inhibitory effect, in particular with respect to Modine ™ high-lead solders (HiLead). In particular, the metaborate and blank systems show a synergistic corrosion inhibitory effect where there is a significant high-lead solder corrosion problem.

EXAMPLE III

Tests were run to determine the corrosion inhibitive properties of the coolant compositions of the invention containing potassium antimony tartrate, and to compare these with compositions containing a simple tartrate salt. The tests were run with in a known borate-containing corrosion inhibitor system. The test concentrates also contained sodium tolyltriazole (which normally used as a copper corrosion inhibitor in coolant compositions).

A KAT-containing concentrate composition according to the invention, and two comparative concentrate compositions, containing respectively, potassium tartrate, and no tartrate salt, were produced and tested. The test concentrates were made by mixing a base of ethylene glycol containing in solution 0.1165 wt.% sodium tolyltriazole (NaTTZ) (50 wt.% solution basis), 1.9620 wt.% sodium borate ($Na_2B_4O_7.5H_2O$ basis), and 0.9914 wt.% NaOH (50 wt.% NaOH solution basis). To two portions of the base concentrate formulations were added potassium antimony tartrate (KAT) as $K(SbO)C_4H_4O_6.\frac{1}{2}H_2O$) (Composition B), and potassium sodium tartrate (KNaT) as $KNaC_4H_4O_6.4H_2O$ (Composition C), respectively. No additional additives were added to the third portion of the base solution (Composition A). The amounts of the additives added are shown in Table III-A. Also shown is the pH of the solution after dilution of each test concentrate at a ratio of 1 part concentrate to 2 parts corrosive water.

TABLE III-A

| Comp. | Concentrate Composition With NaTTZ | | pH |
|---|---|---|---|
| | KAT | KNaT | |
| | (weight percent) | | |
| A | 0.0 | 0.0 | 9.1 |
| B | 0.3 | 0.0 | 8.8 |
| C | 0.0 | 0.3 | 9.1 |

The above concentrate compositions were tested by the procedure described in Example I. The following metals were tested: high lead solder (96 wt.% Pb) Modine ™ solder (HiLead), copper (Cu), lower lead (70 wt.% Pb) ASTM solder (LoLead), brass (Br), steel (St), cast iron (CI), and cast aluminum (CA). In Table III-B, a weight loss is shown by a minus (−) sign, and a weight gain is shown by a (+) sign.

TABLE III-B

| | NaTTZ Formulation Weight Change per Specimen (mg) | | | | | | |
|---|---|---|---|---|---|---|---|
| Comp. | LoLead | Cu | HiLead | Br | St | CI | CA |
| A | −46 | −6 | −7 | −6 | −2 | +2 | −77 |
| B | −20 | −6 | −5 | −5 | 0 | +2 | −43 |
| C | −123 | −6 | −9 | −4 | 0 | +1 | −45 |

The above results indicate protection of high lead Modine ™ (HiLead) solder by use of the concentrates of the invention, as shown by comparing the KAT containing composition (B), with the control composition (A), whereas the KNaT containing composition (C) is actually more corrosive than the control (A). This demonstrates the difference between the use of alkali metal antimony tartrates, and simple tartrate salts as corrosion inhibitors. It is unexpected that the alkali metal antimony salts show superior corrosion protection, and the simple tartrate salts actually promote corrosion in this system.

The results shown in Table III-B also show the superior results from use of the preferred KAT/NaTTZ combination. NaTTZ, as indicated above, is generally used as a copper corrosion inhibitor. It is surprising that NaTTZ combined with KAT has a corrosion inhibitory effect with respect to another metal, high lead solder.

Examination of the weight change values with respect to other metals, shows that the KAT/NaTTZ system does not adversely effect corrosion with respect to those metals.

EXAMPLE IV

Comparative tests were run as in Example III, except instead of a borate base with NaTTZ, a borate base with silicate was used for the concentrate test compositions. The test compositions were made by mixing a base containing 0.3663 wt.% of a soluble silicate, 1.9620 wt.% sodium borate ($Na_2B_4O_7.5H_2O$ basis), and 0.9914 wt.% NaOH (50 wt.% NaOH solution basis). The silicate was available from Diamond Shamrock, Inc. under the tradename "DS-40" and contained 29 wt.% $SiO_2$, 9 wt.% $Na_2O$, the balance being water. Also added was 0.1 wt.% of a silicone which has as an active species the structural formula $CH_3O(CH_2CH_2O)_mC_3H_6Si(OCH_3)_3$, wherein m has an average value of about 7. To two portions of the base were added potassium antimony tartrate (KAT) as $K(SbO)C_4H_4O_6.\frac{1}{2}H_2O$) (Composition E), and potassium sodium tartrate (KNaT) as $KNaC_4H_4O_6.4H_2O$ (Composition F) respectively. No additional additives were added to the third portion of the base solution (Composition D). A summary of the content of the tartrate salts in each composition is in Table IV-A. Also shown is the pH of the solution after dilution of each test concentrate at a ratio of 1 part concentrate to 2 parts water.

TABLE IV-A

| Test | Concentrate Composition With Silicates | | pH |
|---|---|---|---|
| | KAT | KNaT | |
| | (weight percent) | | |
| D | 0.0 | 0.0 | 9.1 |
| E | 0.3 | 0.0 | 8.9 |
| F | 0.0 | 0.3 | 9.1 |

The compositions were tested as in Example III. The results are summarized in Table IV-B. Negative values (−) show a weight loss, positive values (+) show a weight gain.

TABLE IV-B

| | Silicates Weight Change per Specimen (mg) | | | | | | |
|---|---|---|---|---|---|---|---|
| Test | HiLead | Cu | LoLead | Br | St | CI | CA |
| D | −130 | −6 | −5 | −3 | −1 | +2 | −33 |
| E | −47 | −4 | −6 | −4 | 0 | +2 | −15 |
| F | −169 | −2 | −4 | −4 | 0 | +4 | −27 |

The above results indicate a superior protection of high lead Modine ™ solder (HiLead), as shown by comparing the KAT containing composition (E), with the control composition (D). The KNaT containing composition (F) shows no improvement, in fact shows slightly worse corrosion properties with respect to high lead solders than the control composition (D).

Examination of the weight change values with respect to other metals, shows that this system with KAT, borate, and silicate, does not adversely effect corrosion with respect to these metals.

EXAMPLE V

A comparative test was made between compositions containing a monohydric or aliphatic alcohol, methanol, and a polyhydric alcohol, ethylene glycol.

The general procedure was to prepare concentrates of the alcohol and KAT. The concentrate was diluted with ASTM corrosive water (the same test solution used in Example I) to provide a simulated coolant liquid to use for corrosion testing.

For the ethylene glycol, the concentrates EGC-1, EGC-2, and EGC-3, were produced by dissolving KAT and metaborate (as $Na_2B_2O_4.8H_2O$), in ethylene glycol in the proportions shown below in Table V-A.

TABLE V-A

| Ethylene Glycol Concentrates | | | |
|---|---|---|---|
| | EGC-1 | EGC-2 | EGC-3 |
| | | (Weight Percent) | |
| Ethylene Glycol | 99.71 | 98.04 | 95.97 |
| KAT | 0.29 | 0.10 | 0.21 |
| Metaborate | 0.00 | 1.86 | 3.82 |
| TOTAL | 100.00 | 100.00 | 100.00 |

Ethylene glycol test solutions (EGT-1, EGT-2, EGT-3) were then made by diluting the concentrates in ASTM corrosive water in the proportions indicated below in Table V-B, to form the compositions summarized in Table V-C.

TABLE V-B

| Ethylene Glycol Test Solutions From Concentrate | | | |
|---|---|---|---|
| | EGT-1 | EGT-2 | EGT-3 |
| | | (Weight Percent) | |
| EGC-1 | 35.00 | 0.00 | 0.00 |
| EGC-2 | 0.00 | 35.00 | 0.00 |
| EGC-3 | 0.00 | 0.00 | 17.00 |
| Water | 65.00 | 65.00 | 83.00 |
| TOTAL | 100.00 | 100.00 | 100.00 |

TABLE V-C

| Ethylene Glycol Test Solutions | | | |
|---|---|---|---|
| | EGT-1 | EGT-2 | EGT-3 |
| | | (Weight Percent) | |
| Eth. Glycol | 34.90 | 34.315 | 16.315 |
| KAT | 0.10 | 0.035 | 0.035 |
| Metaborate | 0.00 | 0.650 | 0.650 |
| Water | 65.00 | 65.000 | 83.000 |
| TOTAL | 100.00 | 100.000 | 100.000 |

For the methanol, it was found that the KAT was not sufficiently soluble, and production of methanol concentrates was impossible. This is suprising, since KAT is generally considered in the prior art to be soluble in alcohol.

To make non-concentrate solutions of KAT in methanol in the same concentrations shown in Table V-C for ethylene glycol, it was found necessary to form them directly. The procedure was to dissolve the KAT and the mataborate in water, and dilute the resulting solution with methanol. Although a KAT solution in a methanol/water coolant was thus formed, this system would be entirely impractical for modern commercial practice. Aside from the problems of incompatibility with modern coolant system, due to the low boiling point and high vapor pressure of the methanol, antifreeze compositions are currently marketed as concentrates containing very little water. It would be impractical to market a solution that is already substantially diluted, which would be necessary in a methanol system.

EXAMPLE VI

Tests were made comparing methanol and ethylene glycol in coolant compositions. Since it is impossible to produce methanol concentrates containing KAT, as demonstrated above, a special technique was required to solubilize the KAT and other ingredients. The solubilization of ingredients was best achieved for the methanol system in a dilute aqueous solution. A KAT formation based on water was first produced, to which was added either methanol or ethylene glycol. In order to maintain clarity of the base solution, the KAT was added at a pH between about 5 and about 8. The composition of the base formulation is summarized in Table VI-A.

TABLE VI-A

| Base Formulation | |
|---|---|
| | (grams) |
| Water | 3000.000 |
| 75% $H_3PO_4$ | 26.460 |
| 50% NaOH | 19.020 |
| KAT | 3.000 |
| 50% NaTTZ | 3.492 |

To 1525.985 grams of the base formulation was added 1474.015 grams of methanol to produce a methanol test solution. The addition of methanol to the water base solution temporarily caused haze and an increase in pH. To prevent haze in the final test solution, it was necessary to add the methanol very slowly.

Similarly, 1474.015 grams of ethylene glycol was added to 1525.985 grams of the base formulation to produce an ethylene glycol test solution. There was no appearance of a haze or an increase in pH, as with the addition of the methanol.

The objective of the above procedures was to product two test solutions; one containing methanol, and one containing ethylene glycol, both having similar pH, and similar reserve alkalinities.

The test produced for corrosion inhibitive properties was the same as in Example I except the test solutions described above were used, and the temperature and aeration conditions were modified to accommodate the lower boiling point of the methanol solution, as follows:

60° C., 10 ml air/min for 15 days, then
75° C., 10 ml air/min for 6 days, then
73° C. to 75° C., 100 ml air/min for 7 days.

The test solutions were analyzed for selected elements by induction coupled plasma emission spectroscopy. The results are shown in Table VI-B. The solution was analyzed both before and after the corrosion test procedure. The "after" figures are the averages of the three test samples for each solution. The undissolved constituents of the test solutions were separated from the insoluble portions by centrifugation before the tests, and the insoluble residues were also analyzed for selected elements. The results are shown below in Tables VI-B, and VI-C.

TABLE VI-B

| | Solubles | | | |
|---|---|---|---|---|
| | Methanol | | Ethylene Glycol | |
| | (miiligrams/milliliter) | | | |
| | Before | After | Before | After |
| Sb | 120 | 36 | 189 | 195 |
| P | 996 | 1018 | 1100 | 1123 |
| Na | 888 | 924 | 1250 | 1300 |
| K | 42 | 52 | 50 | 60 |

TABLE VI-C

| Insolubles Before Test | | |
|---|---|---|
| | Methanol | Ethylene Glycol |
| | (micrograms/milliliter) | |
| Sb | 35 | 1 |

TABLE VI-C-continued

| | Insolubles Before Test | |
|---|---|---|
| | Methanol | Ethylene Glycol |
| | (micrograms/milliliter) | |
| P | 16 | 8 |
| Na | 14 | 9 |
| K | 1 | 0 |

The solutions were also analyzed before and after the corrosion test procedure, for methanol or ethylene glycol content in volume percent, for pH, and for reserve alkalinity (RA). The volume percent for methanol was measured by a conventional gas chromatography. The volume percent of ethylene glycol was measured by a conventional refractive index technique. The reserve alkalinity (RA) was determined by measuring the milliliters of 0.1N HCl solution required to titrate a 10 ml sample diluted to 100 ml with water to a pH of 5.5. The RA is measure of the amount of buffering action in the system. A higher RA of an antifreeze concentrate is desirable as this indicates a longer effective life of the anticorrosive properties of the antifreeze coolant in an automobile coolant system. The results are summarized in Table VI-D.

TABLE VI-D

| | Test Solution Analysis | | | |
|---|---|---|---|---|
| | Methanol | | Ethylene Glycol | |
| | Before | After | Before | After |
| Vol. % | 58.0 | 52.7 | 47.3 | 48.5 |
| pH | 7.6 | 7.5 | 7.6 | 7.5 |
| RA | 0.64 | 0.59 | 2.03 | 2.01 |

Although an attempt was made to produce solutions of comparative RA, the RA of the methanol solutions was significantly lower than the ethylene glycol system. This indicates a greater difficulty in producing a methanol solution with sufficient RA to provide a commercially acceptable life of the corrosion inhibitive system.

The results of the tests for corrosion inhibitive properties are summarized below in Table VI-E.

TABLE VI-E

| Methanol and Ethylene Glycol Composition With KAT Weight Loss (mg lost/specimen) | | | | | | |
|---|---|---|---|---|---|---|
| HiLead | Cu | LoLead | Brass | Steel | C.Iron | C.Al |
| Methanol System | | | | | | |
| 21 | 1 | 0 | 6 | 0 | 0 | 0 |
| 27 | 1 | 0 | 5 | 0 | 0 | 0 |
| 18 | 1 | 0 | 6 | 1 | 0 | 0 |
| Ethylene Glycol System | | | | | | |
| 5 | 1 | 0 | 4 | 0 | 0 | 0 |
| 1 | 1 | 0 | 5 | 0 | 0 | 0 |
| 1 | 1 | 0 | 6 | 0 | 0 | 0 |

The above corrosion test data show a significantly greater high lead corrosion for high lead Modine TM solder (HiLead) in the methanol system than in the ethanol system. The corrosion inhibition of KAT towards solder bloom corrosion of high lead metals in ethylene glycol is unexpectedly superior to KAT in a methanol system. For other metals tested, the weight losses were not high enough to demonstrate any significant difference.

The elemental analysis data summarized in Tables VI-B and VI-C indicate that during the test the antimony tartrate salt became significantly less soluble in the methanol based coolant solution as compared to the ethylene glycol based coolant solution. This decreasing solubility is believed to have a significant adverse effect on the corrosion inhibitory properties, due to depletion of the effective amount of antimony tartrate in solution available for corrosion inhibition.

EXAMPLE VII

As indicated in Example VI, it is believed that the superior corrosion properties of KAT/ethylene glycol systems (as compared to KAT/methanol systems) is primarily due to the solubility properties of KAT in an ethylene glycol based coolant, compared to a methanol based coolant. Accordingly a test was performed to show a comparison of the solubility of KAT in monohydric alcohols and diols to determine if other alcohols have analogous properties.

Three monohydric alcohols were tested; methanol, ethanol, and n-propanol. Three diols were tested; ethylene glycol, propylene glycol, and diethylene glycol. For each monohydric alcohol and diol a test solution was prepared by combining the ingredients in the amounts shown in Table VII-A. The $H_3PO_4$ was added as a 75 wt.% solution, which NaOH as a 50 wt.% solution, the KAT as $K(SbO)C_4H_4O_6 \cdot \frac{1}{2}H_2O$), and the NaTTZ as a 50 wt.% solution.

TABLE VII-A

| Monohydric Alcohol - Diol Bases | |
|---|---|
| | (grams) |
| Monohydric Alcohol or Diol | 1474.015 |
| $H_3PO_4$ (74 wt. % sol.) | 13.230 |
| NaOH (50 wt. % sol.) | 9.510 |
| KAT | 1.500 |
| NaTTZ (50 wt. % sol.) | 1.746 |

The ingredients for each test solution were combined in a jar while stirring. The jar was closed to minimize evaporation and placed in an oven at 130° F. (54° C.) for 24 hours. The solutions were occasionally stirred during this period. The solutions were than allowed to stand at room temperature to allow undissolved components to settle. After all the solutions had reached the same temperature, 72° F. (22° C.), samples were taken of the saturated supernatant solutions for testing. For solutions in which the supernatant solution was cloudy after being allowed to settle, the solutions were centrifuged, such that clarified saturated solutions of each solution at the same temperature were obtained. The solutions were then analyzed for selected elements by induction coupled plasma emission spectroscopy. The results are summarized in Table VII-B for the monohydric alcohol based solutions, and Table VII-C for the diol based solutions.

TABLE VII-B

| ICP Analysis of Monohydric Alcohol Saturated Solutions | | | |
|---|---|---|---|
| | Methanol | Ethanol | n-Propanol |
| Element | (micrograms/milliliter) | | |
| Sodium | 311 | <6 | <7 |
| Phosphorus | 467 | 27 | <8 |
| Antimony | 192 | 7 | <5 |
| Potassium | 38 | <6 | <7 |

TABLE VII-C

| | ICP Analysis of Diol Saturated Solutions | | |
|---|---|---|---|
| Element | Ethylene Glycol | Propylene Glycol | Diethylene Glycol |
| | | (micrograms/milliliter) | |
| Sodium | 22580 | 2574 | 1515 |
| Phosphorus | 27950 | 3354 | 2016 |
| Antimony | 2808 | 348 | 352 |
| Potassium | 2013 | 164 | 139 |

This example shows that KAT in the diol coolant bases has a significantly higher solubility than KAT in the monohydric alcohol bases. From this data it is expected that KAT in all the diol solutions have similar superior corrosion properties as ethylene glycol solutions shown in the above examples. Likewise, is expected that KAT in all the monohydric alcohol solutions show the same poor corrosion properties as with methanol shown in the above examples.

While this invention has been described with reference to certain specific embodiments and examples, it will be recognized by those skilled in the art that many variations are possible without departing from the scope and spirit of the invention, and that the invention, as described by the claims, is intended to cover all changes and modifications of the invention which do not depart from the spirit of the invention.

What is claimed is:

1. An automobile coolant concentrate comprising (a) a liquid polyhydric alcohol chosen from the group consisting of ethylene glycol, diethylene glycol, propylene glycol, and (b) an alkali metal antimony tartrate in corrosion inhibitory amount with respect to corrosion of lead-containing solders.

2. The composition of claim 1, wherein the polyhydric alcohol is ethylene glycol.

3. The composition of claim 1, wherein the alkali metal antimony tartrate is potassium antimony tartrate.

4. The composition of claim 1, wherein the alkali metal antimony tartrate is present in an amount between about 0.01 wt.% to about 1 wt.%, based on $K(SbO)C_4H_4O_6 \cdot \frac{1}{2}H_2O$.

5. The composition of claim 1, wherein the alkali metal antimony tartrate is present in an amount between about 0.05 wt.% to about 0.5 wt.%, based on $K(SbO)C_4H_4O_6 \cdot \frac{1}{2}H_2O$.

6. The composition of claim 1, wherein the alkali metal antimony tartrate is present in an amount at about 0.1 wt.%, based on $K(SbO)C_4H_4O_6 \cdot \frac{1}{2}H_2O$.

7. The composition of claim 1 additionally comprising a metal surface corrosion inhibitor other than alkali metal antimony tartrate in a corrosion inhibitory amount.

8. The composition of claim 7 wherein the additional metal surface corrosion inhibitor inhibits corrosion with respect to aluminum.

9. The composition of claim 7 wherein the additional metal surface corrosion inhibitor inhibits corrosion with respect to ferrous metals.

10. The composition of claim 7 wherein the additional metal surface corrosion inhibitor is a silicate.

11. The composition of claim 7 wherein the additional metal surface corrosion inhibitor is a borate.

12. An automobile coolant concentrate comprising (a) a liquid polyhydric alcohol chosen from the group consisting of ethylene glycol, propylene glycol, diethylene glycol and mixtures thereof, and (b) corrosion inhibitors in a corrosion inhibitory amount with respect to corrosion of lead-containing solders, the corrosion inhibitors comprising (i) an alkali metal antimony tartrate, and (ii) an azole compound.

13. The coolant concentrate of claim 12 wherein the azole compound is 1,2,3-tolyltriazole, 1,2,3-benzotriazole, or sodium 2-mercaptobenzothiazole.

14. The composition of claim 12, wherein the polyhydric alcohol is ethylene glycol.

15. The composition of claim 12, wherein the alkali metal antimony tartrate is potassium antimony tartrate.

16. The composition of claim 12, wherein the alkali metal antimony tartrate is present in an amount between about 0.01 wt.% to about 1 wt.%, based on $K(SbO)C_4H_4O_6 \cdot \frac{1}{2}H_2O$.

17. The composition of claim 12, wherein the alkali metal antimony tartrate is present in an amount between about 0.05 wt.% to about 0.5 wt.% based on $K(SbO)C_4H_4O_6 \cdot \frac{1}{2}H_2O$.

18. The composition of claim 12, wherein the alkali metal antimony tartrate is present in an amount at about 0.1 wt.%, based on $K(SbO)C_4H_4O_6 \cdot \frac{1}{2}H_2O$.

19. The composition of claim 12 additionally comprising a metal surface corrosion inhibitor other than alkali metal antimony tartrate and azole in a corrosion inhibitory amount.

20. The composition of claim 19 wherein the additional metal surface corrosion inhibitor inhibits corrosion with respect to aluminum.

21. The composition of claim 19 wherein the additional metal surface corrosion inhibitor inhibits corrosion with respect to ferrous metals.

22. The composition of claim 19 wherein the additional metal surface corrosion inhibitor is a silicate.

23. The composition of claim 19 wherein the additional metal surface corrosion inhibitor is a borate.

24. A method for inhibiting corrosion on metal surfaces in a coolant system which comprises adding to the coolant system a concentrate comprising (a) a liquid polyhydric alcohol chosen from the group consisting of ethylene glycol, propylene glycol, diethylene glycol and mixtures thereof, and (b) an alkali metal antimony tartrate in a corrosion inhibitory amount with respect to corrosion of lead-containing solders, to provide a coolant solution, and circulating the coolant solution through the cooling system.

25. The method of claim 24 which additionally comprises adding water to the concentrate before adding the concentrate to the cooling system.

26. The method of claim 24 which additionally comprises adding water to the concentrate after adding the concentrate to the cooling system.

27. A method for inhibiting corrosion on metal surfaces in a coolant system which comprises adding to the coolant system a concentrate comprising (a) a liquid, polyhydric alcohol chosen from the group consisting of ethylene glycol, propylene glycol, diethylene glycol and mixtures thereof, and (b) a corrosion inhibitor in a corrosion inhibitory amount with respect to corrosion of lead-containing solders, the corrosion inhibitor comprising (i) an alkali metal antimony tartrate, and (ii) an azole compound, to provide a coolant solution, and circulating the coolant solution through the cooling system.

28. The method of claim 27 which additionally comprises adding water to the concentrate before adding the concentrate to the cooling system.

29. The method of claim 27 which additionally comprises adding water to the concentrate after adding the concentrate to the cooling system.

30. A method for producing a concentrate composition with corrosion inhibitive properties with respect to corrosion on the surfaces of lead containing solder alloys, which comprises dissolving of alkali metal antimony tartrate in a liquid polyhydric alcohol, chosen from the group consisting of ethylene glycol, propylene glycol, diethylene glycol and mixtures thereof.

31. A method for producing concentrate composition with corrosion inhibitive properties with respect to corrosion on the surfaces of lead solder alloys, which comprises dissolving of alkali metal antimony tartrate and an azole compound in a liquid polyhydric alcohol, chosen from the group consisting of ethylene glycol, propylene glycol, diethylene glycol and mixtures thereof.

* * * * *

UNITED STATES PATENT AND TRADEMARK OFFICE
CERTIFICATE OF CORRECTION

PATENT NO. : 4,686,059
DATED     : August 11, 1987
INVENTOR(S) : Norman E. Payerle It is certified that error appears in the above-identified patent and that said Letters Patent is hereby corrected as shown below:

Column 3 Line 68: delete the word "surfacts" and substitute --surfaces--.

Column 6 Line 47, TABLE IB: delete "I-18" and substitute --I-10--.

Column 8 Line 22: delete "p" and substitute --pH--.

Column 10 Line 58: delete the word "these" and substitute --those--.

Column 12 Line 34: delete the word "produced" and substitute --procedure--.

Signed and Sealed this

Fifteenth Day of March, 1988

Attest:

DONALD J. QUIGG

Attesting Officer

Commissioner of Patents and Trademarks